US011321965B2

(12) United States Patent
Iyer et al.

(10) Patent No.: US 11,321,965 B2
(45) Date of Patent: May 3, 2022

(54) SCALABLE GESTURE AND EYE-GAZE TRACKING IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Ryan Nicholas Comer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/031,118

(22) Filed: Jul. 10, 2018

(65) Prior Publication Data
US 2020/0019763 A1 Jan. 16, 2020

(51) Int. Cl.
*G06F 3/01* (2006.01)
*G06V 40/20* (2022.01)
*G06T 19/00* (2011.01)

(52) U.S. Cl.
CPC .............. *G06V 40/20* (2022.01); *G06F 3/013* (2013.01); *G06F 3/017* (2013.01); *G06T 19/006* (2013.01)

(58) Field of Classification Search
CPC ............................ G06K 9/00335; G06F 3/013
See application file for complete search history.

(56) References Cited

U.S. PATENT DOCUMENTS

| | | | | |
|---|---|---|---|---|
| 2013/0120279 A1* | 5/2013 | Plichta | ................ | G06F 3/04883 345/173 |
| 2013/0301415 A1* | 11/2013 | Archer | .................. | H04W 28/08 370/235 |
| 2014/0098023 A1* | 4/2014 | Zhai | ...................... | G06F 3/0237 345/168 |
| 2014/0201844 A1* | 7/2014 | Buck | ...................... | G06F 21/50 726/26 |
| 2014/0282270 A1* | 9/2014 | Slonneger | ............... | G06F 3/017 715/863 |
| 2015/0289162 A1* | 10/2015 | Frydman | ........... | H04W 28/0284 370/252 |

(Continued)

OTHER PUBLICATIONS

Haitham Badi, et al., "Feature Extraction Technique for Static Hand Gesture Recognition," 2015, pp. 19-41, DOI: 10.15579/gcsr.vol3.ch2, GCSR vol. 3, Science Gate Publishing, available at http://sciencegatepub.com/books/gcsr/gcsr_vol3/GCSR_Vol3_Ch2.pdf.

(Continued)

*Primary Examiner* — Yl Yang
(74) *Attorney, Agent, or Firm* — Fogarty LLP

(57) ABSTRACT

Systems and methods for scalable gesture and eye-gaze tracking in virtual, augmented, and mixed reality (xR) applications are described. In some embodiments, an Information Handling System (IHS) may include a processor and a memory coupled to the processor, the memory having program instructions stored thereon that, upon execution, cause the IHS to: monitor utilization of an IHS resource; capture an image of a gesture performed by a user wearing a Head-Mounted Device (HMD) during an xR application; and generate a feature vector usable to identify the gesture based upon the image, wherein the feature vector has a maximum number of features selected based upon the IHS resource utilization.

18 Claims, 14 Drawing Sheets

(56) References Cited

U.S. PATENT DOCUMENTS

2015/0301609 A1* 10/2015 Park .................. G06F 3/017
                                                    345/173
2017/0072316 A1*  3/2017 Finfter ............... A63F 13/428
2017/0200046 A1*  7/2017 Bang ................ G06K 9/00355
2018/0097705 A1*  4/2018 Srivastava .......... H04L 41/147

OTHER PUBLICATIONS

"A Brief Overview of Gesture Recognition," updated Feb. 10, 1999, 12 pages, available at http://homepages.inf.ed.ac.uk/rbf/CVonline/LOCAL_COPIES/COHEN/gesture_overview.html.

* cited by examiner

SCALABLE GESTURE AND EYE-GAZE TRACKING IN VIRTUAL, AUGMENTED, AND MIXED REALITY (XR) APPLICATIONS

FIELD

The present disclosure generally relates to Information Handling Systems (IHSs), and, more particularly, to systems and methods for scalable gesture and eye-gaze tracking in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for scalable gesture and eye-gaze tracking in virtual, augmented, and mixed reality (xR) applications are described. In an illustrative, non-limiting embodiment, an Information Handling System (IHS) may include a processor and a memory coupled to the processor, the memory having program instructions stored thereon that, upon execution, cause the IHS to: monitor utilization of an IHS resource; capture an image of a gesture performed by a user wearing a Head-Mounted Device (HMD) during an xR application; and generate a feature vector usable to identify the gesture based upon the image, wherein the feature vector has a maximum number of features selected based upon the IHS resource utilization.

In some implementations, the IHS resource may include the processor. Additionally, or alternatively, the IHS resource may include the memory. The maximum number features may be selected to maintain the IHS resource utilization below a predetermined level. Moreover, the maximum number of features may be selected based upon a calibration curve that associates a reduction in a number of used features with a corresponding reduction in IHS resource utilization. Additionally, or alternatively, the maximum number of features may be selected based upon a calibration curve that associates an increase in number of used features with a corresponding increase in IHS resource utilization.

The program instructions, upon execution, may cause the IHS to identify an increase in IHS resource utilization and reduce the maximum number of features to prevent reaching a maximum IHS resource utilization. The program instructions may also cause the IHS to identify a decrease in IHS resource utilization and increase the maximum number of features without reaching a maximum IHS resource utilization.

In some cases, the program instructions, upon execution, may cause the IHS to: rank features usable to identify a first gesture and a second gesture; determine that the second gesture is indistinguishable from the first gesture based upon a comparison between a higher-ranked subset of features of the first gesture a higher-ranked subset of features of the second gesture; and disable recognition of the second gesture. To rank the features, for example, the IHS may calculate a Pearson's Correlation Coefficient (PCC) for each of the features; and order the features by respective PCCs, wherein a feature having a value closest to zero is ranked highest.

The program instructions, upon execution, may cause the IHS to select the first and second gestures based upon an Euclidian distance between the first and second gestures. The program instructions may also further the IHS to select one of a plurality of eye-gaze tracking (EGT) methods based upon the IHS resource utilization.

In another illustrative, non-limiting embodiment, a method may include monitoring utilization of an IHS resource and selecting an EGT method usable to detect eye movement of a user wearing an HMD coupled to the IHS during an xR application based upon the IHS resource utilization. The EGT method may be selected from the group consisting of: a two-dimensional (2D) method, or a three-dimensional (3D) method.

Additionally, or alternatively, the EGT method may be selected based upon a calibration that associates a reduction in EGT features or accuracy, with a corresponding reduction in IHS resource utilization. Additionally, or alternatively, the EGT method may be selected based upon a calibration that associates an increase in EGT features or accuracy with a corresponding increase in IHS resource utilization.

The method may also include capturing an image of a gesture performed by the user; and generating a feature vector usable to identify the gesture based upon the image, wherein the feature vector has a maximum number of features selected based upon the IHS resource utilization.

In yet another illustrative, non-limiting embodiment, a hardware memory device of an IHS may have program instructions stored thereon that, upon execution by a hardware processor, cause the IHS to: monitor utilization of an IHS resource; select an EGT method based upon the IHS resource utilization, wherein the EGT method is usable to detect eye movement of a user wearing an HMD during an xR application; capture an image of a gesture performed by the user; and generate a feature vector usable to identify the gesture based upon the image, wherein the feature vector has a maximum number of features selected based upon the IHS resource utilization.

The eye-gaze tracking method may be selected based upon a calibration that associates: (i) an increase in EGT features or accuracy with a corresponding increase in IHS resource utilization; or (ii) a reduction in EGT features or accuracy with a corresponding reduction in IHS resource utilization. Moreover, the maximum number of features may be selected based upon a calibration that associates: (i) an increase in number of used features with a corresponding increase in IHS resource utilization; or a reduction in a number of used features with a corresponding reduction in IHS resource utilization.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for scalable gesture and eye-gaze tracking in virtual, augmented, and mixed reality (xR) applications. These techniques are particularly useful in xR applications that employ HMDs, Heads-Up Displays (HUDs), and eyeglasses—collectively referred to as "HMDs."

Figure 1:
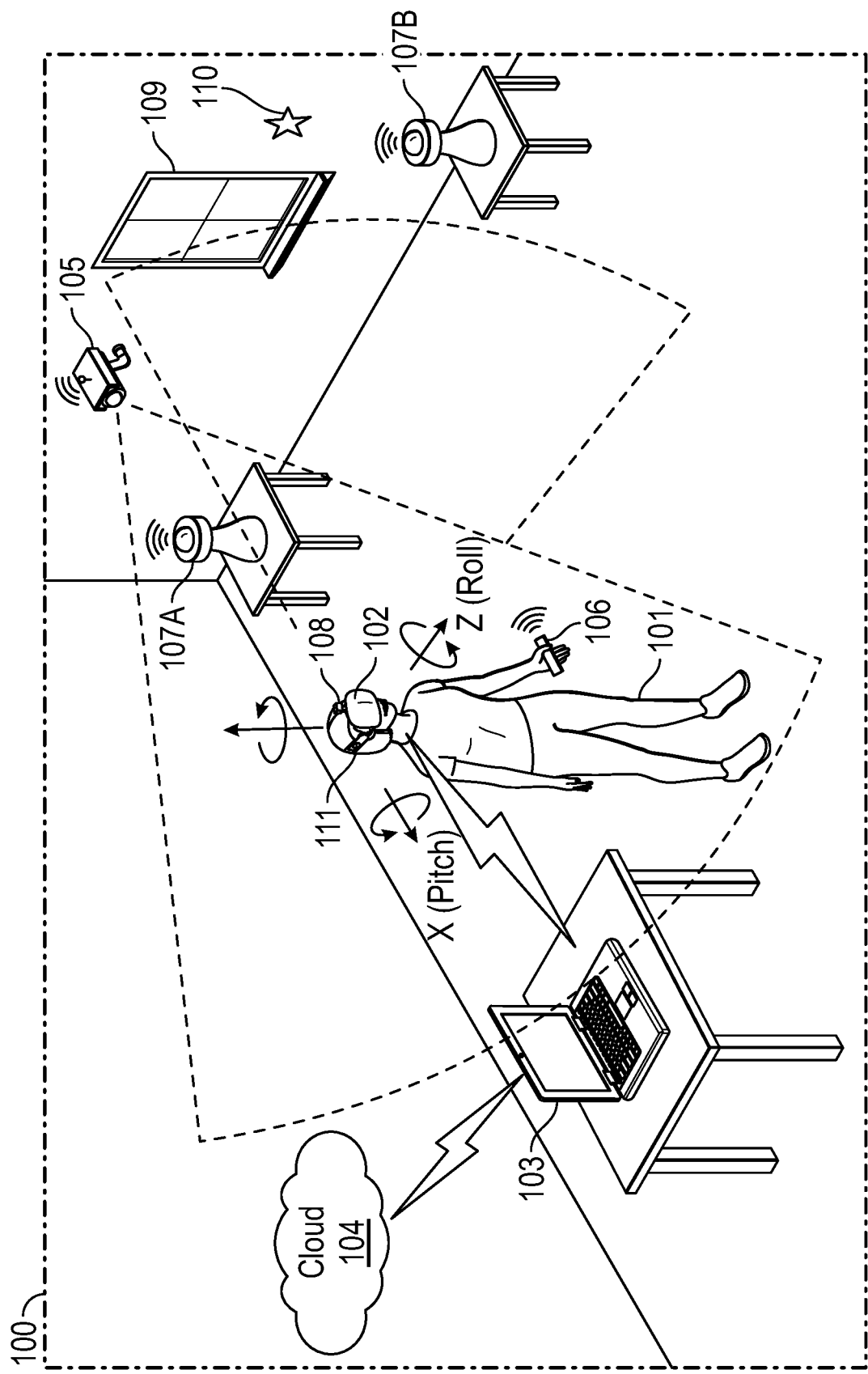
FIG. 1 is a perspective view of an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment between a plurality of users. For example, each user may wear their own HMD tethered to a different host IHS, such as in the form of a video game or a productivity application (e.g., a virtual meeting).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of selected features in the images captured by camera 108, and corrects the localization of landmarks in space using comparisons and predictions.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

Figure 2:
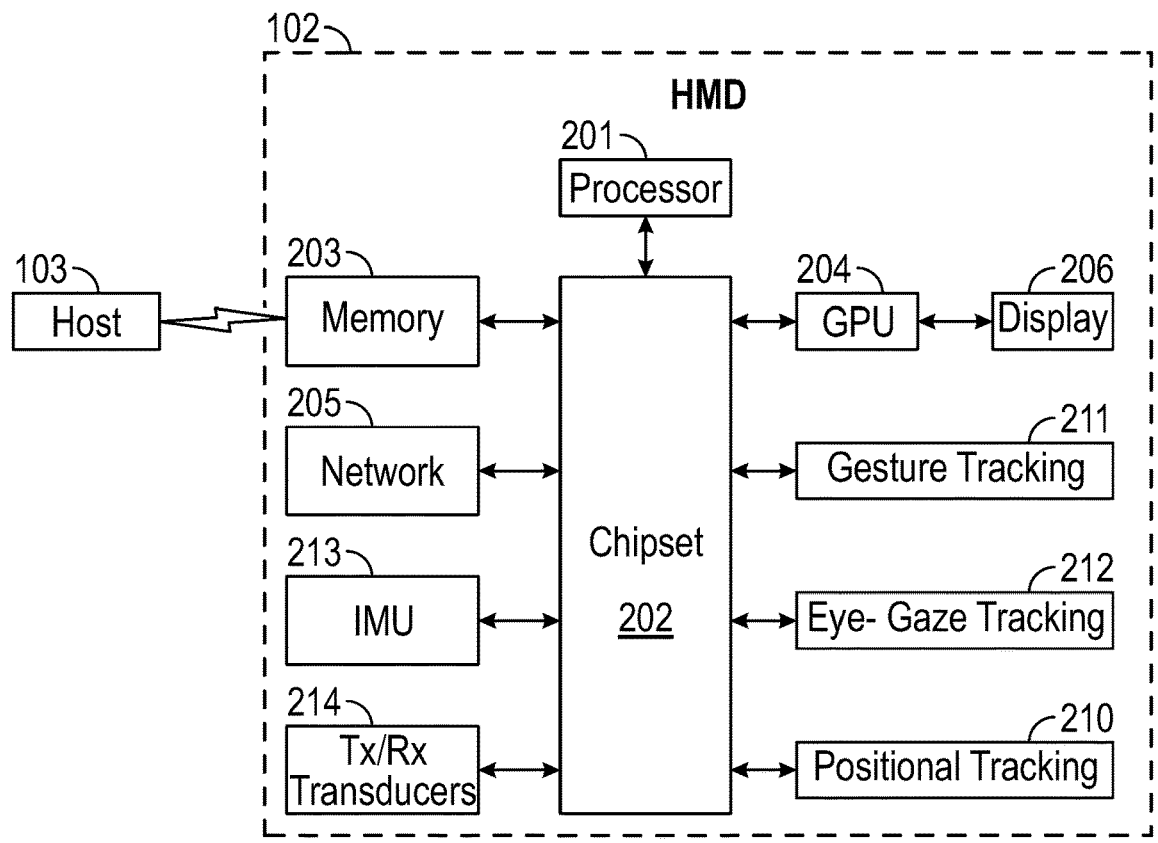
FIG. 2 is a block diagram of an example of a Head-Mounted Device (HMD) and a host Information Handling System (IHS), according to some embodiments.

FIG. 2 is a block diagram of an example HMD 102 and host IHS 103 comprising an xR system, according to some embodiments. As depicted, HMD 102 includes components configured to create and/or display an all-immersive virtual environment; and/or to overlay digitally-created content or images on a display, panel, or surface (e.g., an LCD panel, an OLED film, a projection surface, etc.) in place of and/or in addition to the user's natural perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, eye-gaze tracking system 212, and inertial measurement unit (IMU) system 213.

Positional tracking system 210 may include one or more optical sensors (e.g., a camera 108) configured to determine how HMD 102 moves in relation to environment 100. For example, an inside-out tracking system 210 may be configured to implement markerless tracking techniques that use distinctive visual characteristics of the physical environment to identify specific images or shapes which are then usable to calculate HMD 102's position and orientation.

Gesture tracking system 211 may include one or more cameras or optical sensors that enable user 101 to use their hands for interaction with objects rendered by HMD 102. For example, gesture tracking system 211 may be configured to implement hand tracking and gesture recognition in a 3D-space using a gesture camera mounted on HMD 102, such as camera 108. In some cases, gesture tracking system 211 may track a selectable number of degrees-of-freedom (DOF) of motion, with depth information, to recognize gestures (e.g., swipes, clicking, tapping, grab and release, etc.) usable to control or otherwise interact with xR applications executed by HMD 102, and various one and two-handed gesture sequences described in more detail below.

Additionally, or alternatively, gesture tracking system 211 may include one or more ultrasonic sensors 111 configured to enable Doppler shift estimations of a reflected acoustic signal's spectral components.

Eye-gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of the user's head. In some cases, IMU system 213 may be configured to a detect a direction, extent, and/or speed of rotation (e.g., an angular speed) of the user's head in real-time, during execution of an xR application.

Transmit (Tx) and receive (Rx) transducers and/or transceivers 214 may include any number of sensors and components configured to send and receive communications using different physical transport mechanisms. For example, Tx/Rx transceivers 214 may include electromagnetic (e.g., radio-frequency, infrared, etc.) and acoustic (e.g., ultrasonic) transport mechanisms configured to send and receive communications, to and from other HMDs, under control of processor 201. Across different instances of HMDs, components of Tx/Rx transceivers 214 may also vary in number and type of sensors used. These sensors may be mounted on the external portion of frame of HMD 102, for example as sensor 111, to facilitate direct communications with other HMDs.

In some implementations, HMD 102 may communicate with other HMDs and/or host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. For example, HMD 102 may include a monaural, binaural, or surround audio reproduction system with one or more internal loudspeakers. Furthermore, components represented as discrete in FIG. 2 may, in some embodiments, be integrated with other components. In various implementations, all or a portion of the functionality provided by the illustrated components may be provided by components integrated as a System-On-Chip (SOC), or the like.

Figure 3:
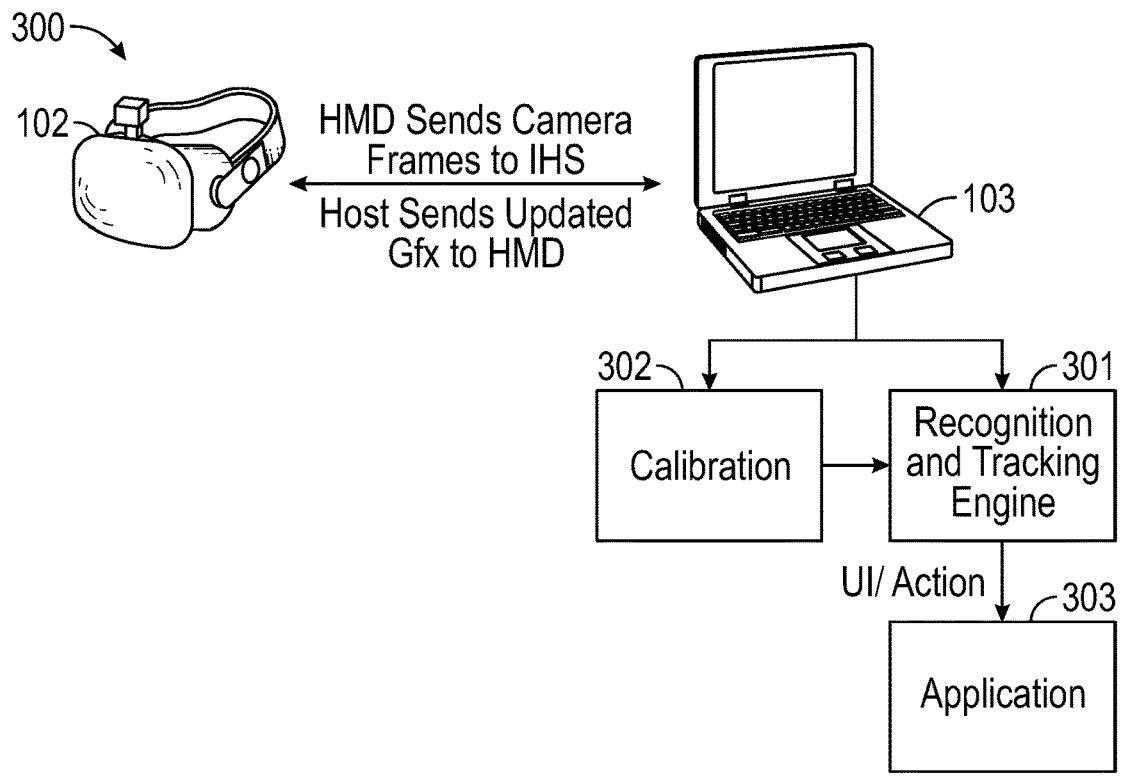
FIG. 3 is a block diagram of an example of a recognition and tracking system, according to some embodiments.

FIG. 3 is a block diagram of an example of recognition and tracking system 300. In various embodiments, modules 301-303 may be stored in memory 203 of host IHS 103, in the form of program instructions, that are executable by processor 201. In execution, system 300 may employ gesture tracking hardware 211, which may include gesture camera(s) 108 and/or Ambient Light Sensor (ALS) and/or ultrasonic transceiver(s) 111 mounted on HMD 102. Additionally, or alternatively, system 300 may employ eye-gaze tracking hardware 212, which may include an inward-facing camera configured to provide images of the user's eyes.

Generally, recognition and tracking engine 301 may be configured to perform Gesture Recognition and Tracking (GRT), and/or Eye-Gaze Tracking (EGT).

With respect to GRT, the process begins when video frame data (e.g., a video or depth-video stream) is received at host IHS 103 from camera 108 of HMD 102. In some implementations, the video data may have already been processed, to some degree, by gesture tracking component 211 of HMD 102. Then, video data is further processed by recognition and tracking engine 301 using calibration component 302 to control aspects of xR application 303, by identifying various gestures and/or gesture sequences that constitute user input to xR application 303.

At least a portion of the user 101's body may be identified in the video frame data obtained using camera 108 using recognition and tracking engine 301. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

In some embodiments, recognition and tracking engine 301 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in calibration component 302. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some implementations, each joint may be assigned a number of parameters, such as, for example, Cartesian coordinates specifying joint position, angles specifying joint rotation, and other parameters specifying a conformation of the corresponding body part (e.g., hand open, hand closed, etc.), etc. Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other implementations, the use of a virtual skeleton may not be necessary. For example, in other implementations, raw point-cloud data may be sent directly to a feature extraction routine within recognition and tracking engine 301. The feature extraction routine may be a part of the data reduction process configured to find discriminating information in the recorded images, producing a list of descriptions, or a feature vector.

As used here, the term "feature vector" refers to is an n-dimensional vector with its components computed by image analysis. Commonly used visual cues for finding features include, but are not limited to: color, texture, shape, spatial information, and motion. The n individual features within a feature vector may be derived from one or more visual cues, such as the combination of color and texture. In some cases, the features to be extracted, to produce a feature vector may, may be configurable or selectable by a user.

In contrast with GRT, an EGT process may involve using NIR light sources to produce glints on the surface of the cornea of the user's eye, and then capturing images of the eye region using an inward-facing camera. Recognition and tracking engine 301 may estimate the user's gaze from the relative movement between the pupil center and glint positions. Particularly, an EGT algorithm may perform corneal reflection based calculations that use NIR illumination to estimate the gaze direction or the point of gaze using polynomial functions, or a geometrical model of the human eye.

To perform gaze estimation, recognition and tracking engine 301 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, recognition and tracking engine 301 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, recognition and tracking engine 301 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

Cross-ratio-based EGT methods may project a pattern of NIR lights on the eye of the user, and it may estimate the gaze position using invariant property of projective geometry. From the glint positions, the pupil and the size of the monitor screen, gaze location is estimated using two perspective projections. With these two projections, a transformation relating the scene and camera image planes is obtained, and the projection of the point-of-gaze on the scene plane to the image of the pupil center on the camera plane may be estimated.

In appearance-based EGT methods, information from the eye region is represented using a model trained with a set of features extracted from eye images. A statistical model may be used to represent shape and texture variations and trained using images of the eye region annotated with landmark points. The shape vector is the concatenated coordinates of all landmark points, and may be obtained using Principal Component Analysis (PCA).

Shape-based EGT methods may employ deformable templates of the eye region, using two parabolas for eye contours and circle for the iris, and fitting them to an eye image. These shape-based EGT methods may then find the similarity between the template of a chosen region with images of that region using a normalized cross-correlation, modified cross-correlation, or mean-square-error calculation.

As such, in various embodiments, recognition and tracking engine 301 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, recognition and tracking engine 301 may be configured to follow the user's gaze direction for natural exploration of a visual scene by capturing the user's visual perspective. Moreover, recognition and tracking engine 301 may also be configured to estimate user gaze and blink-state for interacting with the xR environment; several types of eye movements and gestures, such as saccades, smooth pursuit and nod-roll may be used. For example, recognition and tracking engine 301 may be configured to use of gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Scalable Gesture Recognition and Tracking (GRT)

Typically, HMDs have minimum host IHS specifications (e.g., CPU, GPU, memory, etc.) required for properly executing an xR application. When running an xR application, however, Gesture Recognition and Tracking (GRT)

processes can consume significant host IHS processing and memory resources. For example, a lower-end host IHS may only be capable of performing GRT, for gestures captured with cameras operating with a 1024×768-pixel resolution, with a maximum capture frame rate of 10 frames-per-second (fps).

The inventors hereof have recognized that, in many cases, it may be desirable to run GRT at a full 30 fps, or at the maximum possible fps, despite host IHS 103's hardware limited capabilities. In those cases, for a better overall user experience, it may be more desirable to provide scalable GRT processing, with support for fewer recognizable gestures, but that can be executed in real-time (e.g., at 30 fps).

Accordingly, the inventors have developed systems and methods that enable host IHS 103, which may have an application—whether or not part of ongoing xR processes—that starts to consume more compute resources, to scale down GRT dynamically and granularly, and to handle varying complexities and numbers of gestures. As such, these systems and methods may provide more options than changing only the bandwidth (fps and/or image resolution) of incoming gesture data, over-clocking, and/or thread management—all of which can lead to an unsatisfactory user experience.

In some embodiments, systems and methods described herein may provide scalable and real-time adaptive host IHS compute modifications for performing GRT; without the need to change the GRT processing performed by the HMD. Particularly, in various implementations, these systems and methods may control (i.e., increase and/or decrease) host IHS resource usage (e.g., processing or compute, memory, etc.) by varying the maximum size allowed for feature vectors—the output of the feature extraction routine in GRT.

The dimensionality of the feature vector may have a direct impact on the resource load of GRT. For example, a large number of features allow a gesture recognition algorithm to detect more gestures, but the load on the host IHS also goes up. Moreover, when using fewer features, systems and methods described herein reduce the total number of recognizable gestures to maintain the accuracy of GRT, while scaling down the resource load on the host IHS.

In a first embodiment, a scalable GRT calibration operation may rank features and determine how host IHS 103 performs at different feature vector sizes. The ranking of features may be performed, for example, using Pearson's Correlation Coefficient (PCC). For each feature, we may find the average PCC between with every other feature. If the average is close to 0, then the feature is not very correlated to any other feature and is therefore a better feature choice for discrimination.

Also, during calibration, the host-HMD pair may run the gesture recognition algorithm with different feature vector sizes. Resource utilization is observed on host IHS 103 to determine how host IHS 103 performs with different numbers of features. The output of this operation may include a calibration curve or table relating feature vector size to resource utilization on host IHS 103.

In a second embodiment, GRT may be scaled up or down by varying the feature vector size in steady-state on host IHS 103 in response to observing the resource utilization on host IHS 103 in real-time. Particularly, if the resource utilization from GRT goes above a preset user defined load threshold, then the calibration curve or table is looked up for a given resource's maximum utilization target, in order to determine and set the max vector size to throttle the resource load on host IHS 103.

For example, if we want host IHS 103 to run a gesture recognition algorithm at 20% CPU utilization, then look at the calibration curve or table, to see what feature vector size corresponds to 20% CPU utilization. Moreover, when determining which features to use, we may look at the average PCC found in calibration. In some cases, features with an average PCC closer to 0 may be selected over those who with larger PCCs (a small PCC means that a feature is not very correlated to other features).

In a third embodiment, a gesture toggling technique, performable in steady state by host IHS 103, may determine which gestures should remain active when the feature vector size goes down, and which new gestures may be recognized when the feature vector size goes up. This may be performed to ensure that the gesture recognition algorithm does not misclassify two gestures that are very similar due to fewer or a reduced number of features being considered.

For example, the average Euclidean distance between training samples for two different gestures may be used to determine gesture similarity. A small Euclidean distance between two training samples means that the samples are very similar, and therefore so are the gestures. The output of this operation is an array for each gesture which gives the average Euclidean distance between itself and every other gesture. In some cases, determining gesture similarity for a given vector size across all vector sizes may be done as part of calibration.

As such, systems and methods described herein may control GRT without degrading user experience, in a manner superior to overclocking or CPU/GRU thread management on host IHS 103. These systems and methods may leverage existing HMD GRT processing and cameras, modifying only the host IHS's processing without affecting a rendering engine or application. Moreover, these systems and methods may enable scaled-down GRT on lower-end IHSs (and scaled-up GRT in higher-end IHSs), and/or may enable dynamic control of the amount of resources consumed by GRT, in response to other loads executed by the host IHS.

Figure 4:
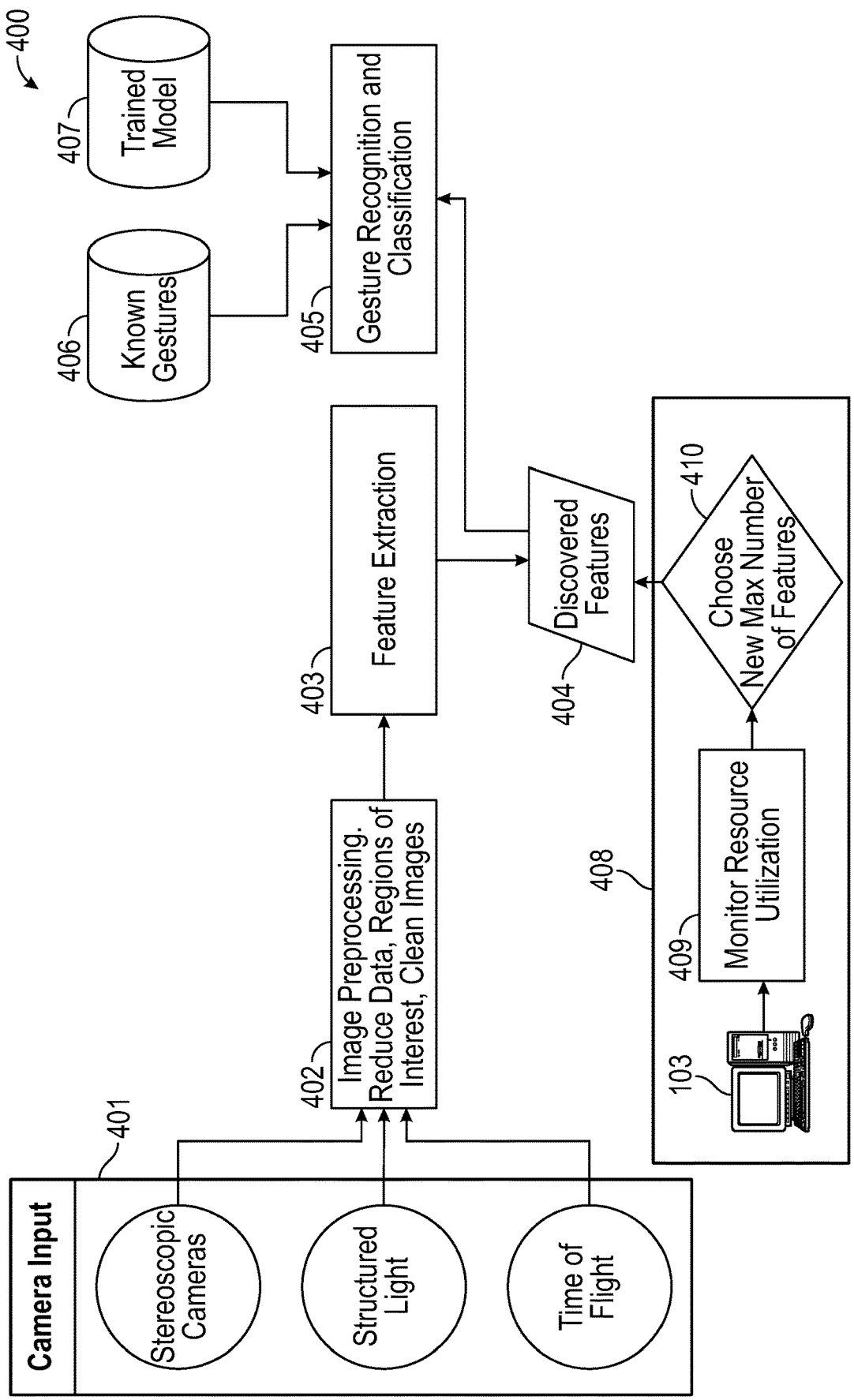
FIGS. 4 and 5 are flowcharts of examples of scalable gesture recognition methods, according to some embodiments.

FIG. 4 is a flowchart of gesture recognition method 400. In various embodiments, method 400 may be performed by recognition and tracking engine 301, when executed by host IHS 103. In operation, block 402 receives camera input(s) 401 (e.g., image or video frames) from gesture capture sources such as, for example: stereoscopic camera(s), structure light(s), and/or time-of-flight devices. Then, block 402 performs any number of image preprocessing operations, reduces the amount of data to be handled, identifies regions of interest (e.g., based on a gaze vector from an EGT operation), and/or cleans images.

Block 403 performs feature extraction operations upon the preprocessed images, and produces discovered features 404. In some cases, features 404 may be produced in the form of a feature vector and/or histogram, having n individual features. Discovered features 404 may be recognized and classified at block 405. For example, block 405 may compare and match a feature vector produced by block 403, against a feature vector of a previously-calibrated gesture stored in database 406 and/or against trained model 407.

Scalable portion 408 of method 400 includes block 409, which monitors resource utilization of host IHS 103 (e.g., "$ top" command in LINUX). For instance, block 409 may monitor the load and/or utilization of resources, including, but not limited to: CPU 201, GPU 204, and/or memory 203. At block 410, in response to changes in resource utilization detected by block 409, method 400 selects a new maximum number of features to be considered amongst discovered features 404.

Figure 5:
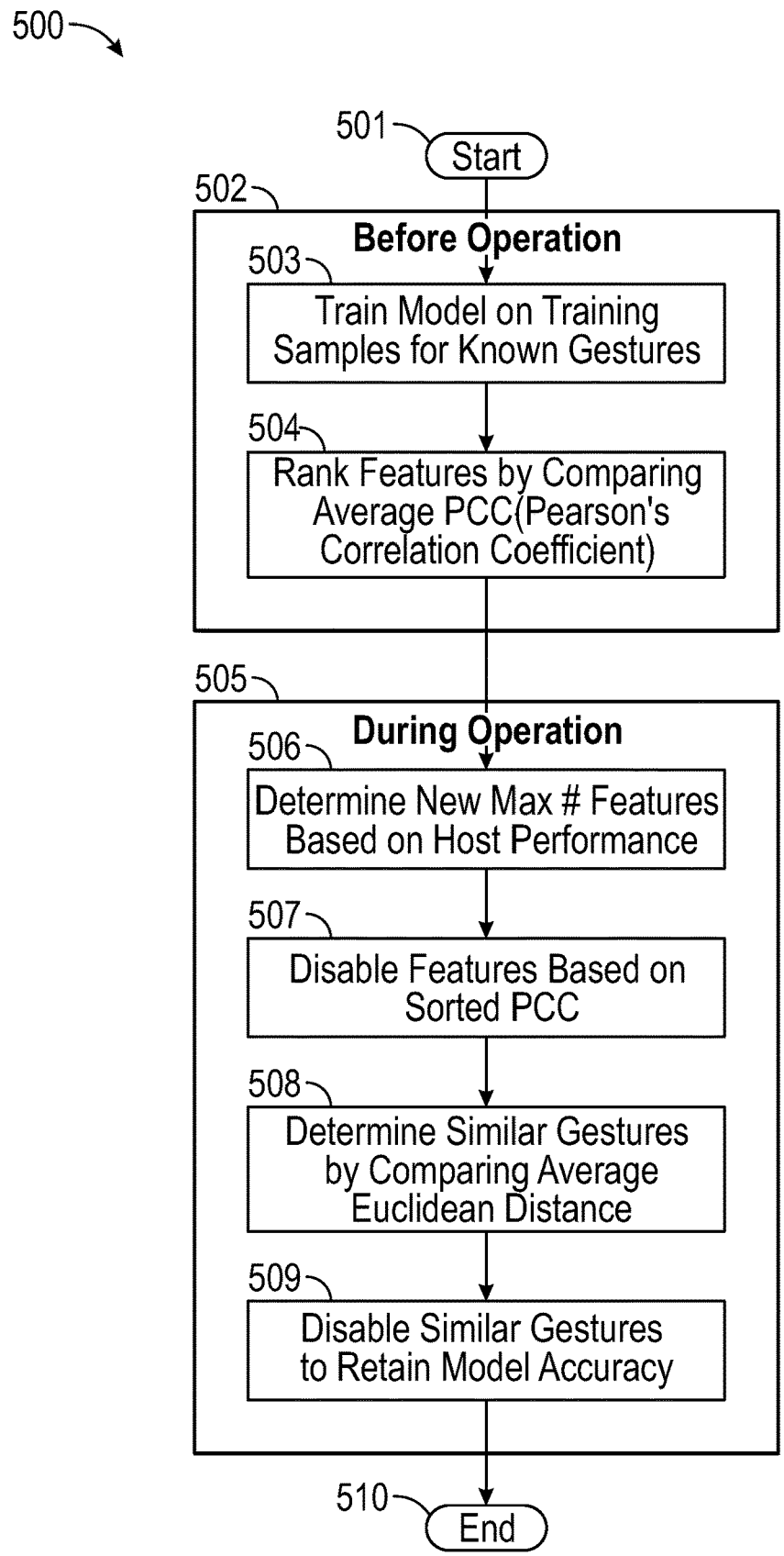

FIG. 5 is a flowchart of scalable gesture recognition method 500, implementable in connection with scalable portion 408 of method 400 in FIG. 4. Particularly, method 500 starts at block 501 and, in a pre-steady-state phase 502 ("before operation"), where block 503 trains a GRT model with training samples of known gestures. At block 504, method 500 ranks extracted features by comparing their average Pearson Correlation Coefficients (PCCs). For example, each feature may be ranked in increasing order of PCC, such that the higher-ordered feature has its PCC value closest to zero, among other features of the same feature vector and/or gesture.

In steady-state ("during operation") 505, block 506 determines a new maximum number of features to be used, based upon resource utilization of host IHS 103. Block 507 disable one or more features based upon the feature list sorted by PCC. Block 508 identifies the average Euclidian distance between two or more gestures. Block 509 disables gestures that may be too similar to each other, after a reduction in the maximum number of features in a feature vector, to be distinguishable from each other by recognition and tracking engine 301; and method 500 ends at block 510.

Figure 6:
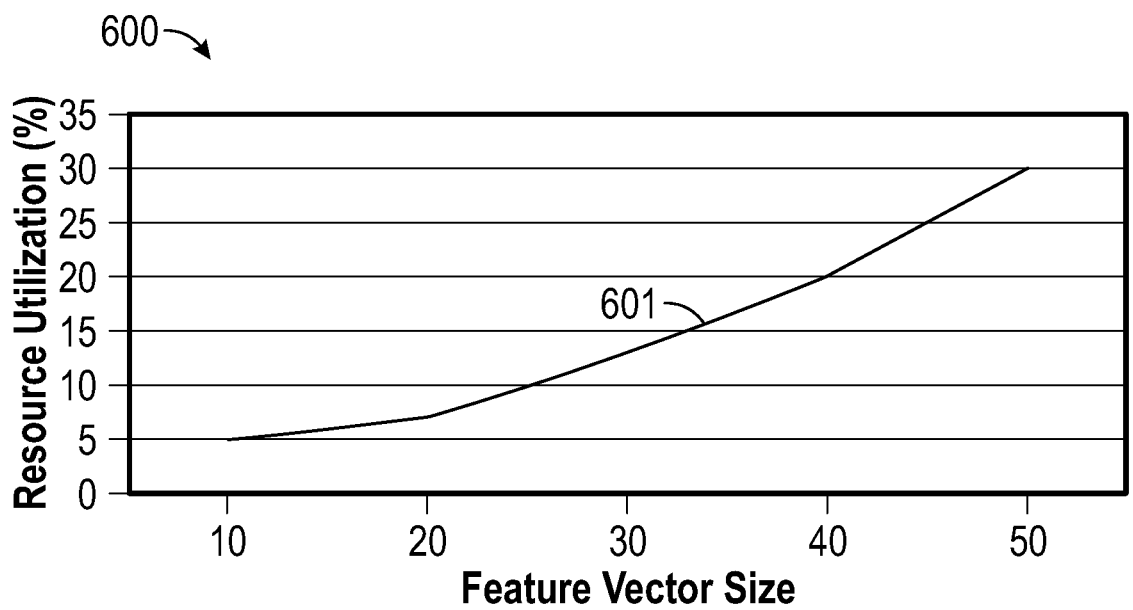
FIG. 6 is a graph of an example of a feature vector size calibration curve, according to some embodiments.

FIG. 6 shows graph 600 of feature vector size calibration curve 601. Particularly, curve 601 indicates how the size of the feature vector used to track and/or recognize gestures changes in response to host IHS resource utilization. In this example, a feature vector with 10 features corresponds to a 5% CPU utilization, while a feature vector with 50 features corresponds to a 30% utilization.

Figure 7:
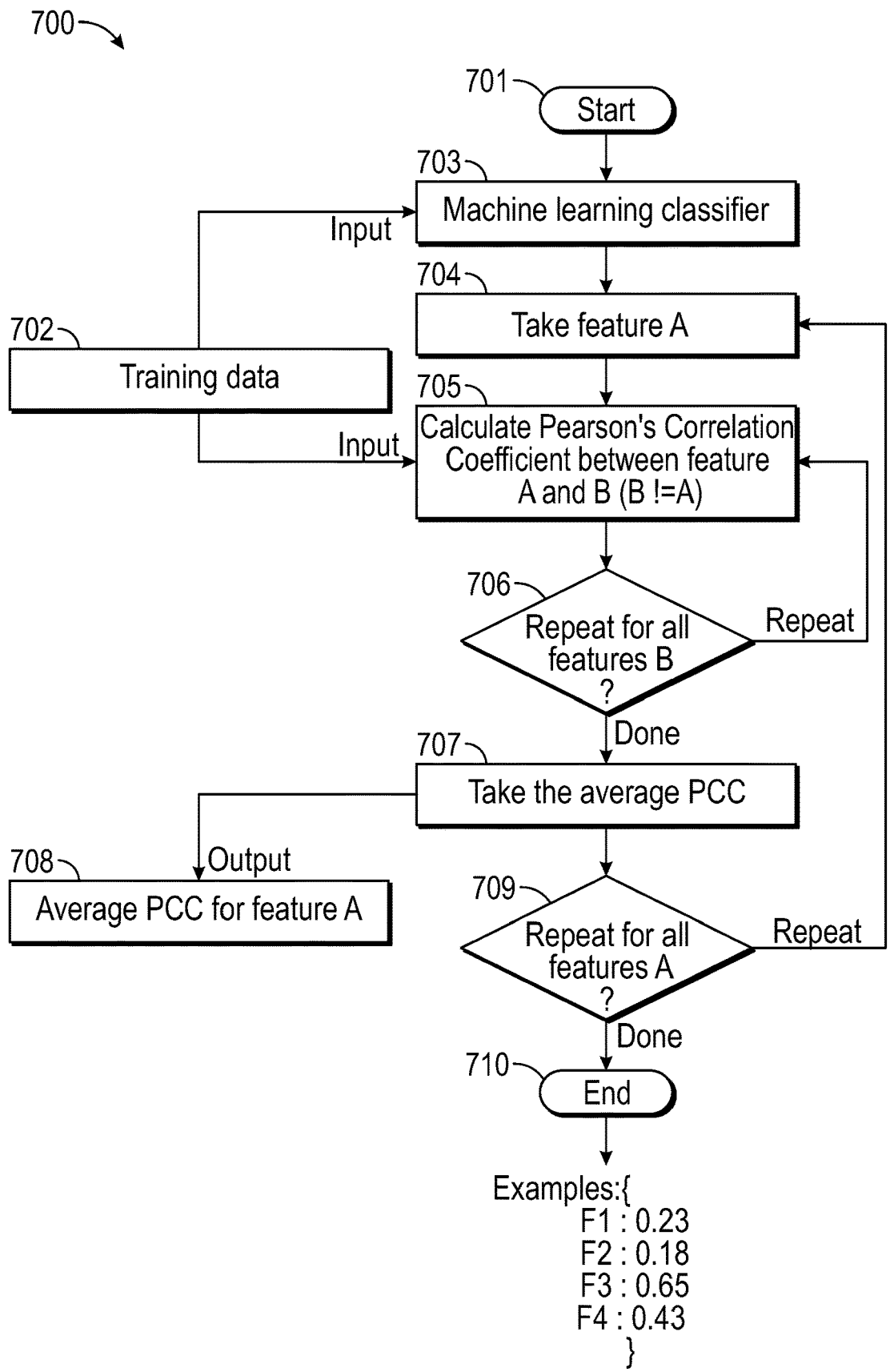
FIG. 7 is a flowchart of an example of a calibration method, according to some embodiments.

FIG. 7 is a flowchart of calibration method 700, implementable in pre-steady-state phase of method 500 in FIG. 5. Particularly, method 700 begins at block 701. At block 702, training data (e.g., known gestures) is provided as input to machine learning classifier 703, which extracts feature A from an image. Block 705 calculates a PCC between feature A and feature B (another extracted feature), and block 706 creates a loop such that all features are compared, and PCC values are calculated for each feature.

Block 707 takes the average PCC and produces output 708 that includes average PCC values for feature A. Block 709 creates a loop such that all feature As may be determined, before method 700 ends at block 710 (e.g., {F1:0.23, F2:0.18, F3:0.65, F4:0.43}).

Figure 8:
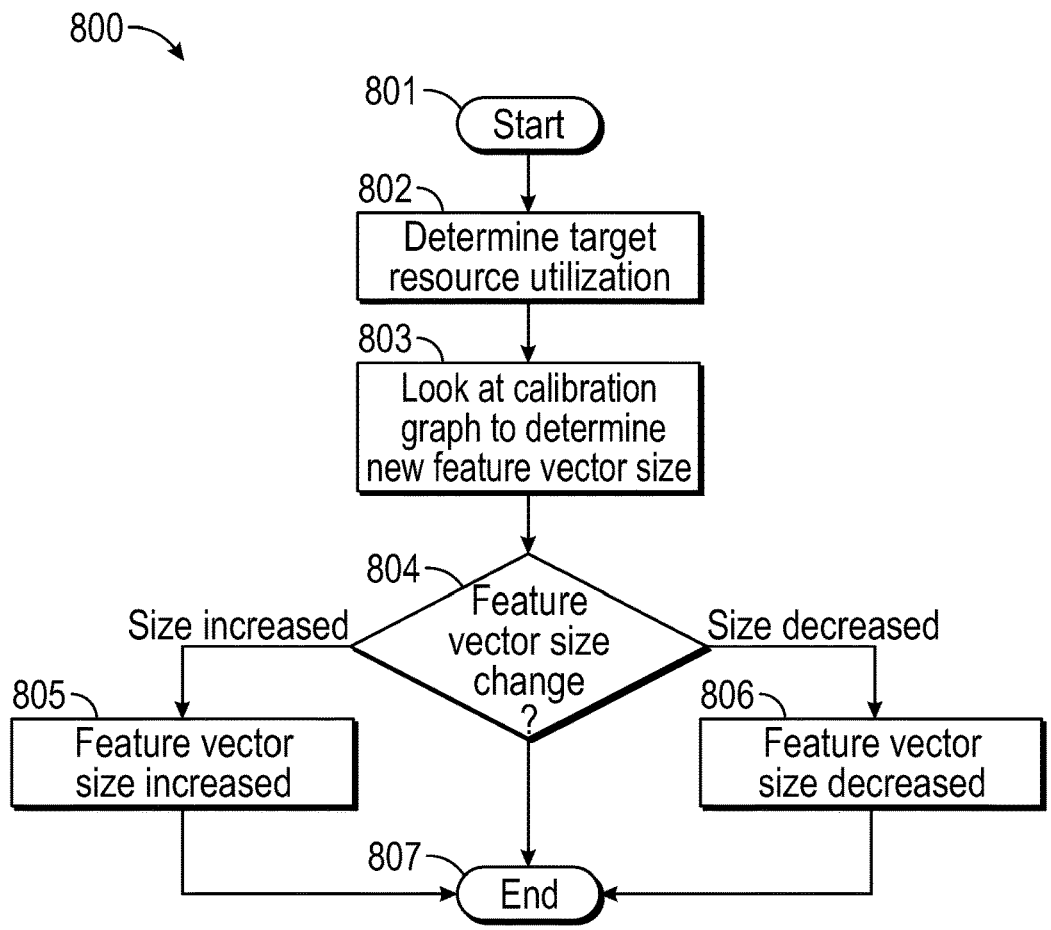
FIG. 8 is a flowchart of an example of a feature vector size variation method, according to some embodiments.

FIG. 8 is a flowchart of feature vector size variation method 800, implementable in connection with block 410 in FIG. 4. Method 800 begins at block 801, and block 802 determines or monitors a host IHS's resource utilization. At block 803, method 800 determines a new feature vector size, for example, for mainlining the resource utilization below a selected threshold level. If block 804 determines that the new feature vector size (that is, the number of features in the feature vector) is different from the current size, block 805 increases the feature vector size and block 804 decreases the feature vector size, before method 800 ends at block 807.

Figure 9:
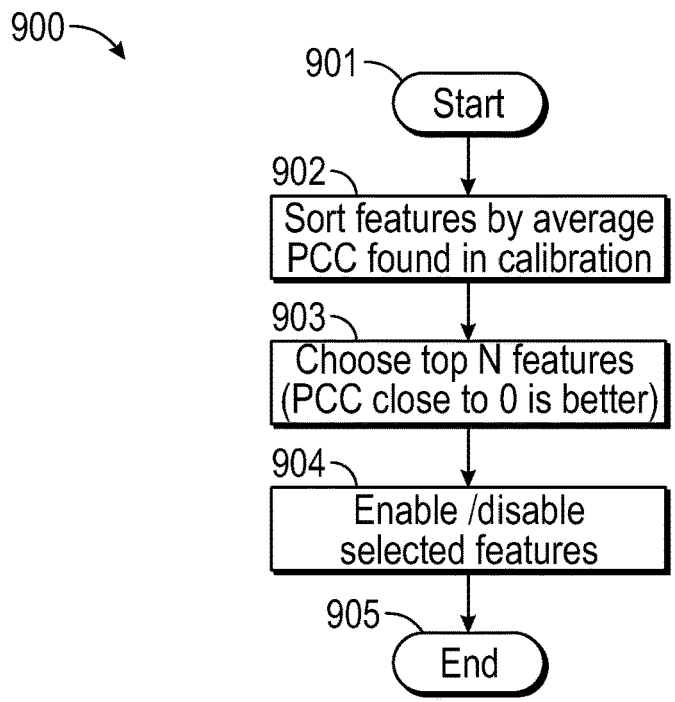
FIG. 9 is a flowchart of an example of a feature selection method, according to some embodiments.

FIG. 9 is a flowchart of feature selection method 900, implementable in connection with block 410 in FIG. 4. Method 900 begins at block 901. At block 902, method 900 sorts features by their average PCC (e.g., calculated in calibration method 700). At block 903, method 900 selects the top N features (PCC closest to 0 is selected). Then, block 904 enables and/or disables selected features, before method 900 ends at block 905.

Figure 10:
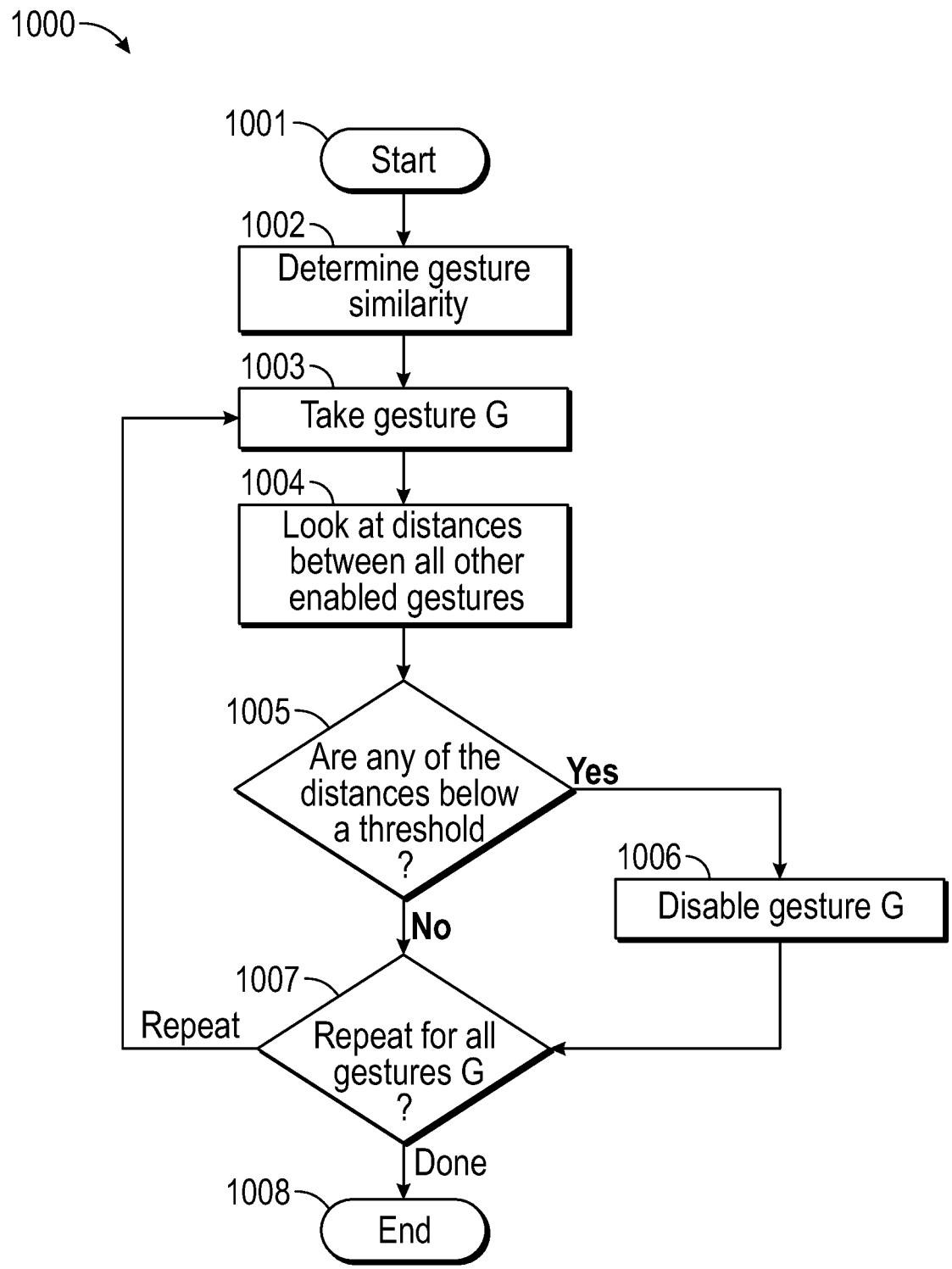
FIG. 10 is a flowchart of an example of a gesture toggling method, according to some embodiments.

FIG. 10 is a flowchart of gesture toggling method 1000, implementable in connection with block 410 in FIG. 4. Method 1000 begins at block 1001. At block 1002, method 1000 determines similarities between different gestures. Block 1003 takes gesture G, and block 1004 determines a distance or difference (e.g., Euclidian distance) between G and all other enabled gestures (e.g., FIG. 11). Block 1005 determines whether any of distances or differences are below a threshold. If so, block 1006 disables gesture G. Block 1007 creates a loop for repeating method 1000, with all gestures, before method 1000 ends at block 1008.

Figure 11:
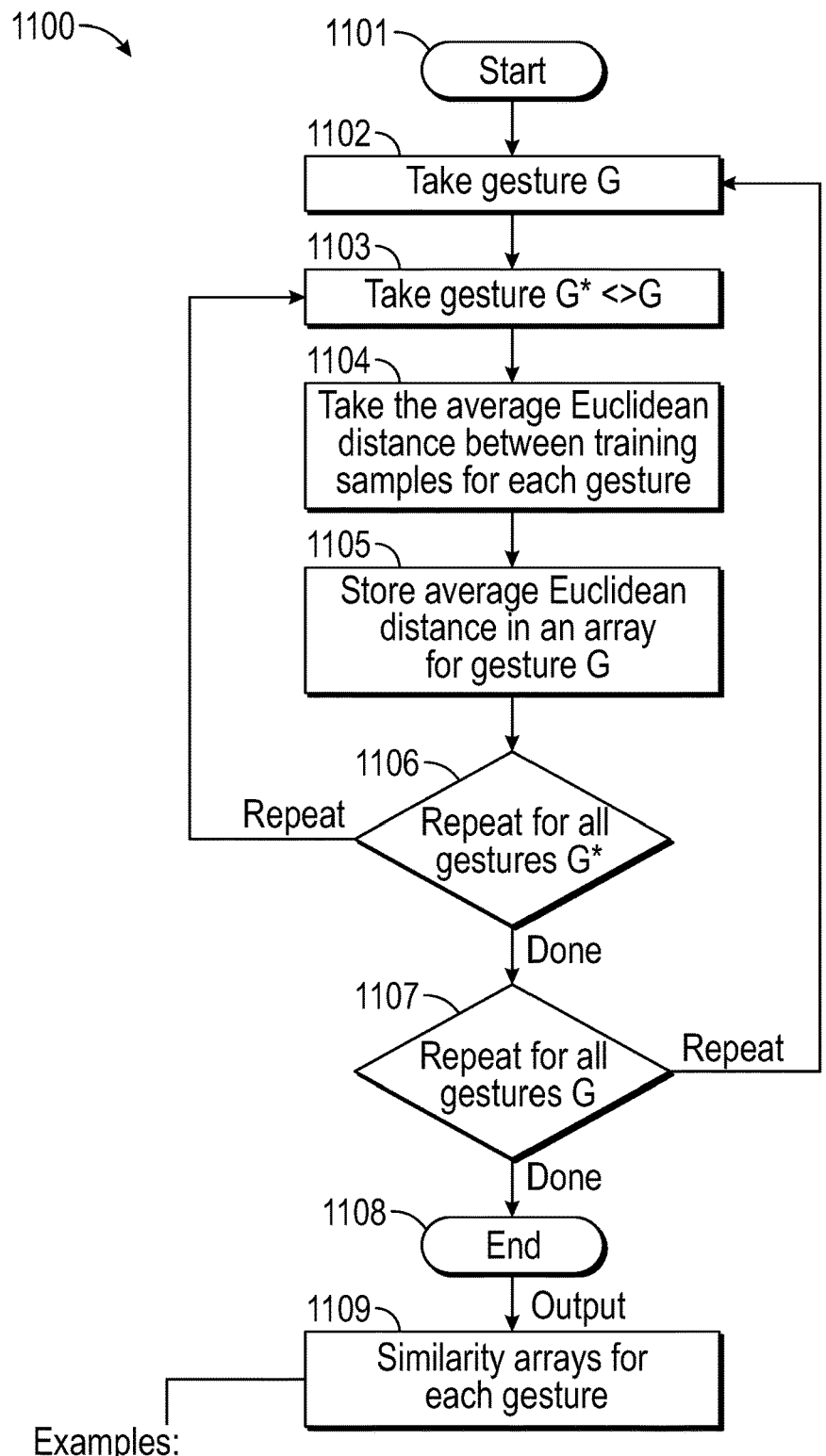
FIG. 11 is a flowchart of an example of a method for determining a similarity between different gestures, according to some embodiments.

FIG. 11 is a flowchart of method 1100 for determining a similarity between different gestures, implementable in connection with block 1004 in FIG. 10. Method 1100 begins at block 1101. Block 1102 selects gesture G, and block 1103 selects different gesture G*.

Block 1104 calculates the average Euclidian distance between training samples for each gesture, and block 1105 stores the calculated distances in an array for gesture G. Block 1106 creates a loop with block 1103 to repeat those operations for all gestures G*. And block 1107 creates another loop with block 1102 to repeat those operations for all gestures G, before method 1100 ends at block 1108 producing, as its output, a similarity array for each gesture 1109 (e.g., G1:[N/A, 14, 10, 13]; G2:[14, N/A, 18, 8]; G3:[10, 18, N/A, 20]; G4:[13, 8, 20, N/A]).

Figure 12:
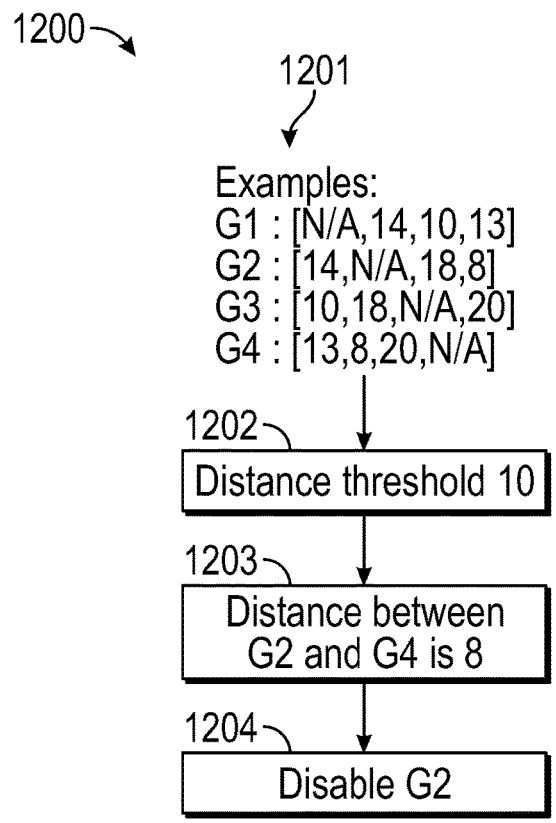
FIG. 12 is a flowchart of an example of a gesture toggling use-case, according to some embodiments.

FIG. 12 is a flowchart of a gesture toggling use-case 1200, provided for sake of illustration. Particularly, use-case 1200 receives similarity array 1201 (e.g., from method 1100) for example gestures G1-G4. Block 1202 selects a distance threshold value of 10, and block 1203 determines that the distance between example gestures G2 and G4 is 8—that is, below the threshold. In response to this determination, block 1204 disables gesture G2.

Figure 13:
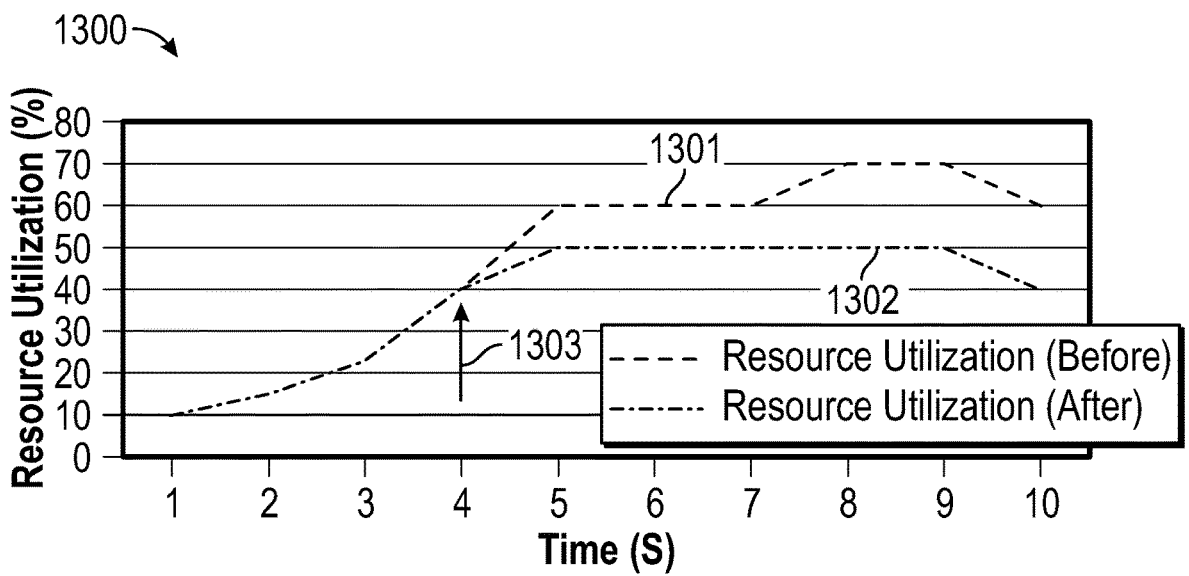
FIG. 13 is a graph of an example of a scalable gesture use-case based on IHS resource utilization, according to some embodiments.

FIG. 13 shows graph 1300 of a scalable gesture use-case. Curve 1301 shows host IHS resource utilization (e.g., CPU load, etc.) before application of the systems and methods described herein, whereas curve 1302 shows resource utilization after application of these systems and methods. Curves 1301 and 1302 coincide until point 1303 where time=4 seconds. At that point, curve 1302 shows that, in contrast with curve 1301, when using the systems and methods described herein, GRT may be dynamically scaled-down to maintain resource utilization at a maximum set value (e.g., 50%).

Scalable Eye-Gaze Tracking (EGT)

EGT processes also consume significant host IHS processing and memory resources. In some cases, for example, a lower-end host IHS may have up to a 50% utilization of processing core per eye, for VGA EGT image resolution. To address these, and other problems, systems and methods described herein may be configured to scale EGT up or down, trading accuracy for resource usage in a granular manner, beyond over-clocking and/or thread management.

In various embodiments, systems and methods described herein may determine gaze vectors and/or depth information in steady-state using any number of EGT hardware and/or algorithms. Furthermore, several different EGT methods may be dynamically selected, thus scaling EGT processing loads down (or up) in response to variations in resource utilization. These systems and methods may provide a scalable and real-time adaptive host IHS EGT modification service or method, by changing the EGT method being used, at any given time, with its restrictive parameters enabled/disabled, without having to change the processing done by HMD 102 for non-offloaded situations.

In some embodiments, calibration of EGT method to CPU/GPU load may be performed to generate a baseline for given HMD-host pair. This calibration operation may yield a curve or table that enables looking up, for a given resource utilization target, a selected one of a plurality of available EGT methods that is expected to run under that target— which may change in real-time during operation of the host IHS. Then, in steady-state, when the host IHS is loaded (e.g., due to another xR subsystem or an application outside xR taking up compute resources), there may be a determination of optimal EGT compute method to switch the EGT subsystem to, in order to keep the EGT's resource usage under a specified maximum.

As such, in various embodiments, systems and methods described herein may control the HMD EGT experience with gradual degradation (or improvement) of user experience, with fewer or no dropped frames. In some cases, these systems and methods may leverage existing HMD-IHS EGT outputs (for non-offload EGT cases) to the host IHS, with modifications to host IHS's EGT processing only. Additionally, or alternatively, these systems and methods may involve no modifications to rendering applications (other than intercepting EGT outputs from the HMD to the rendering application), and may scale to enable CPU/GPU—based EGT on lower-end host IHSs.

For purposes of explanation, assume that seven different EGT methods are available to HMD 102 and/or host IHS 103, which are listed below by decreasing order of computational complexity and accuracy (although any other EGT method and/or parameter may be used):

TABLE I

| EGT Method | Type | Parameter(s) |
|---|---|---|
| 1 | 3D Model @ Max fps | None |
| 2 | 3D Model @ Max fps | No subpixel processing |
| 3 | 2D Regression @ Max fps | None |
| 4 | 2D Regression @ Max fps | No subpixel processing |
| 5 | 3D Model @ Max fps | Same capture resolution; lower compute resolution; no subpixel processing |
| 6 | 2D Regression @ Max fps | Same capture resolution; lower compute resolution; no subpixel processing |
| 7 | 2D Regression @ Max fps | Same capture resolution; lower compute resolution; no subpixel processing; lower-order (simpler) polynomial for regression |

Figure 14:
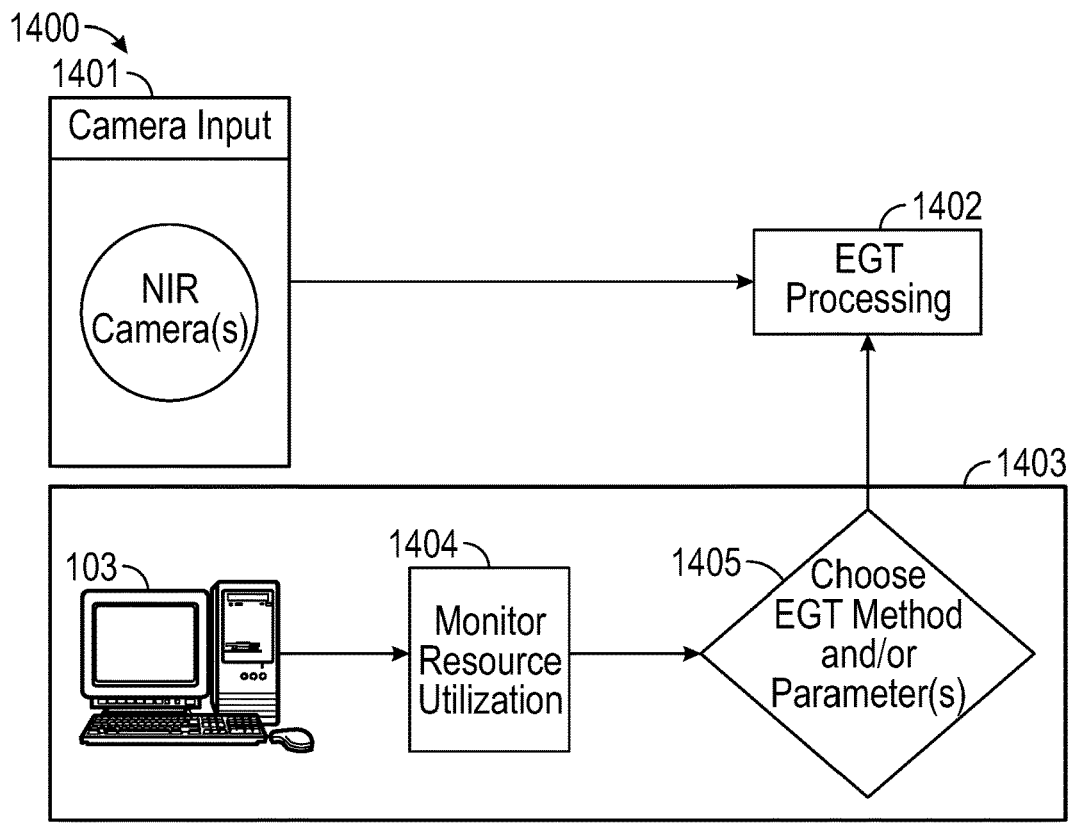
FIG. 14 is a flowchart of an example of a scalable eye-gaze tracking method, according to some embodiments.

FIG. 14 is a flowchart of scalable eye-gaze tracking method 1400. In various embodiments, method 1400 may be performed by recognition and tracking engine 301, when executed by host IHS 103. In operation, block 1402 camera input(s) 1401 (e.g., image or video frames) from an inward-facing, NIR camera, or the like. Then, block 1402 performs any number of EGT processing operations, for example, to produce a gaze vector indicative of the user's gaze, to track or recognize an eye-movement or blinking command, etc.

Scalable portion 1403 of method 1400 includes block 1404, which monitors resource utilization of host IHS 103 (e.g., "$ top" command in LINUX). For instance, block 1404 may monitor the load and/or utilization of resources including, but not limited to: CPU 201, GPU 204, and/or memory 203. At block 1405, in response to changes in resource utilization detected by block 1404, method 1400 selects a new EGT method or algorithm to be performed by EGT processing block 1402.

Figure 15:
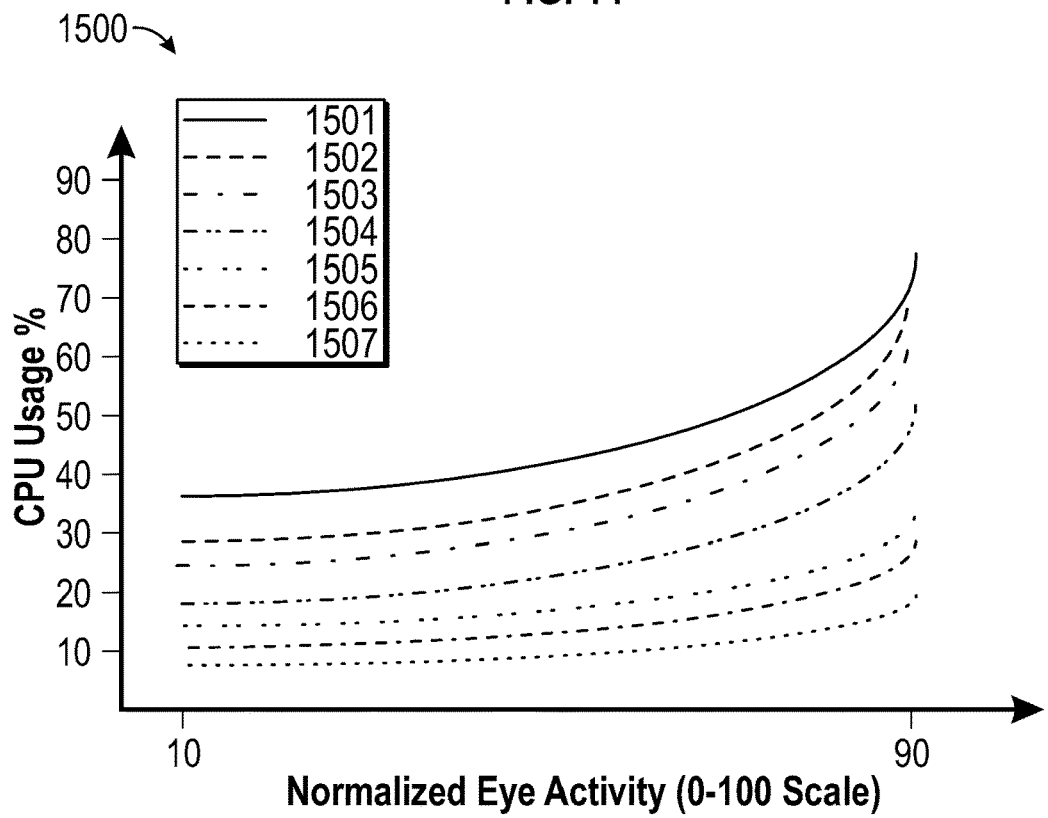
FIG. 15 is a graph of an example of eye-gaze tracking (EGT) calibration curves, according to some embodiments.

FIG. 15 shows graph 1500 of an example of EGT calibration curves for various EGT methods 1501-1507. Particularly, curves 1501-1507 correspond to methods 1-7 of Table I. Each of curves 1501-1507 show how much CPU usage (%) is taken up by execution of its associated EGT method, in response to normalized eye activity.

Figure 16A:
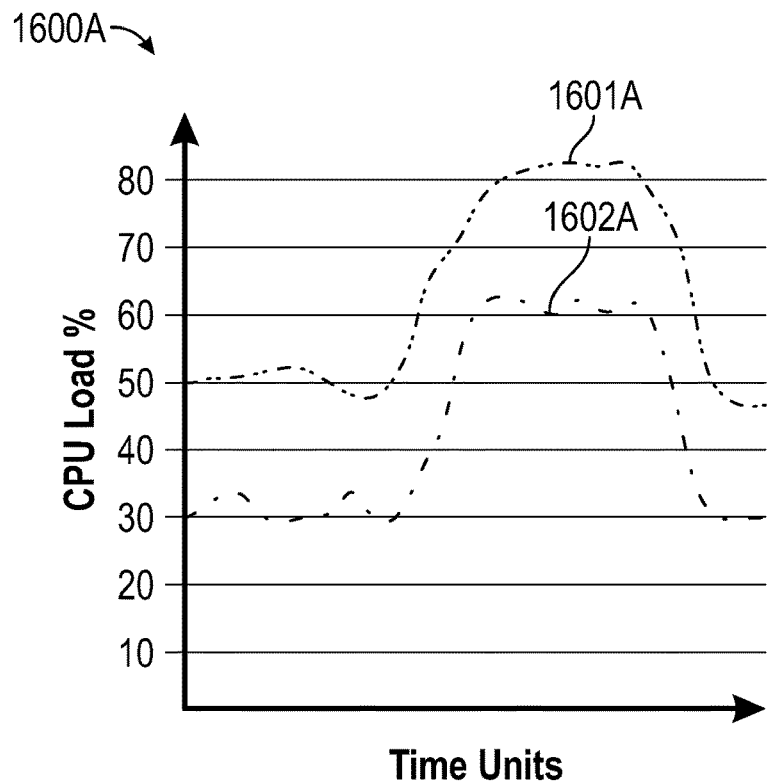
FIGS. 16A and 16B are graphs of an example of IHS resource utilization without and with the use of a scalable EGT method, respectively, according to some embodiments.
Figure 16B:
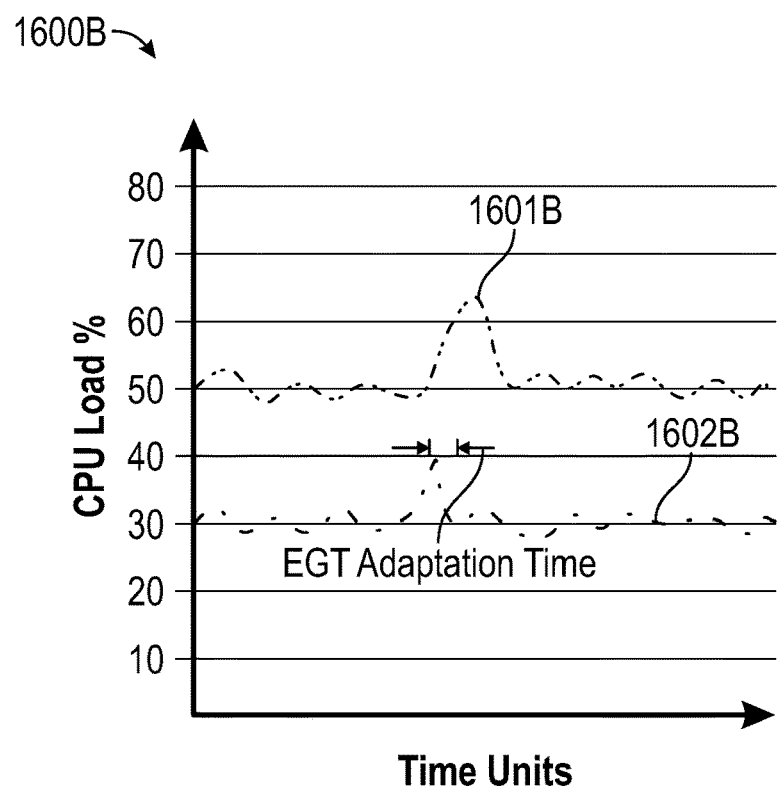

FIGS. 16A and 16B show graphs 1600A and 1600B of an example of IHS resource utilization, without and with the use of scalable EGT method 1400, respectively. As illustrated, curve 1601A of FIG. 16A shows overall CPU usage over time, and curve 1601B of FIG. 16B shows CPU usage due to EGT processes, in both cases with scalable EGT method 1400 turned off or absent. In contrast, curve 1601B shows overall CPU usage over time, and curve 1602B shows CPU usage due to EGT processes, when under control scalable EGT method 1400. In FIG. 16B, when CPU processes spike up, a different EGT method may be selected such that, after an EGT adaptation time, the CPU load due to EGT processing is reduced.

Figure 17:
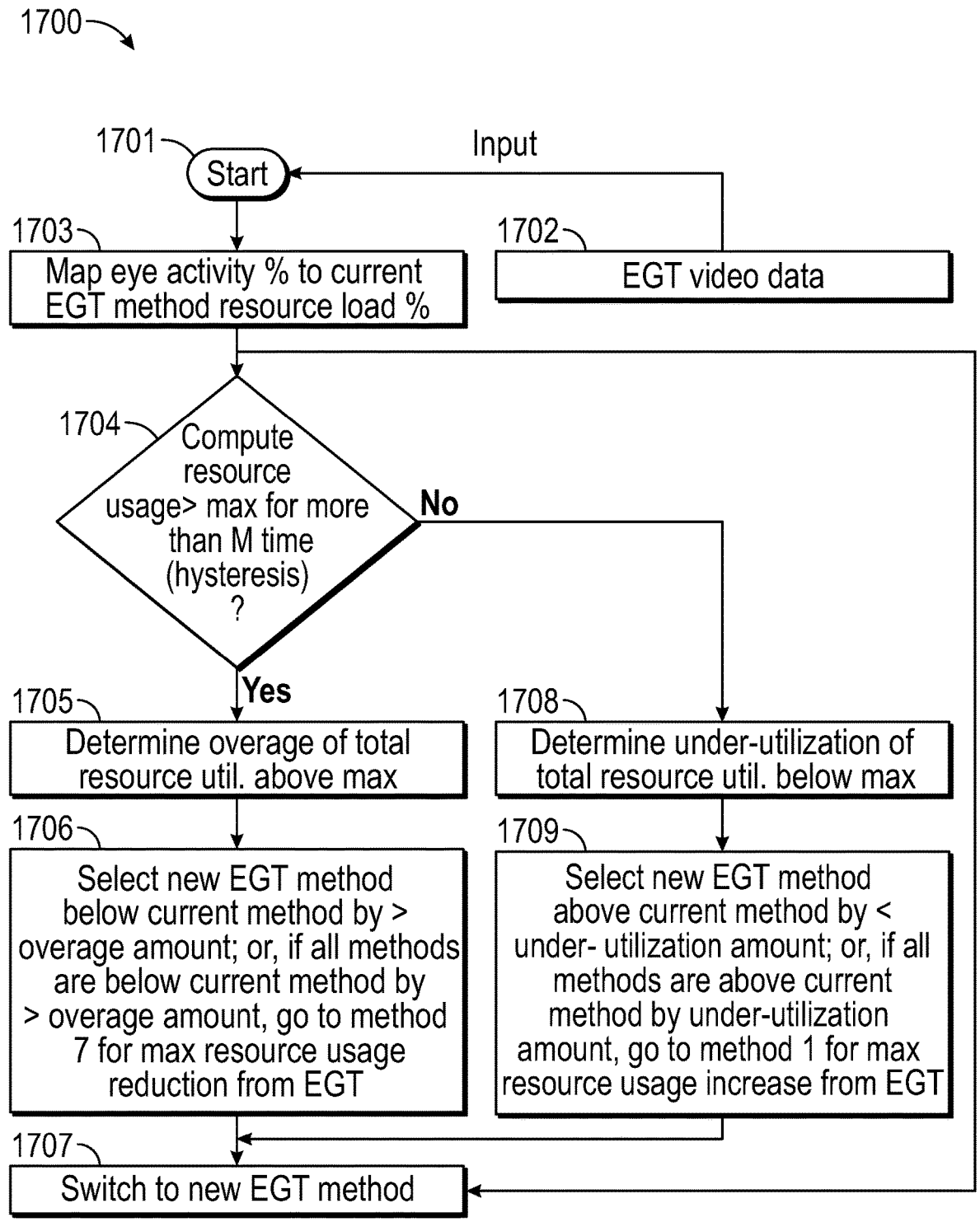
FIG. 17 is a flowchart of an example of a scalable EGT method, according to some embodiments.

FIG. 17 is a flowchart of scalable EGT method 1700, implementable in connection with scalable portion 1403 of method 1400 in FIG. 14. Particularly, method 1700 starts at block 1701 and receives EGT video data (e.g., NIR images) 1702. Block 1703 maps eye activity (e.g., normalized) to a current rate of resource load due to EGT processes or threads.

Block 1704 determines whether resource usage has been greater than a maximum for more than a preselected amount of time, to add hysteresis. If so, block 1705 determines the overage of total resource utilization above a maximum threshold value, and block 1706 selects a new EGT method below a current method by more than the overage amount; or, if all methods are below the current method by more than the overage amount, block 1706 selects EGT method 7 for maximum resource usage reduction from EGT processes.

If the resource usage has not been overcome, block 1708 determines the underage of total resource utilization below a maximum threshold value, and block 1709 selects a new EGT method above a current method by less than an under-utilization amount; or, if all methods are above the current method by more than the under-utilization amount, block 1709 selects EGT method 1 for maximum resource usage increase from EGT processes. Block 1707 switches to the newly selected (up or down) EGT method.

Figure 18:
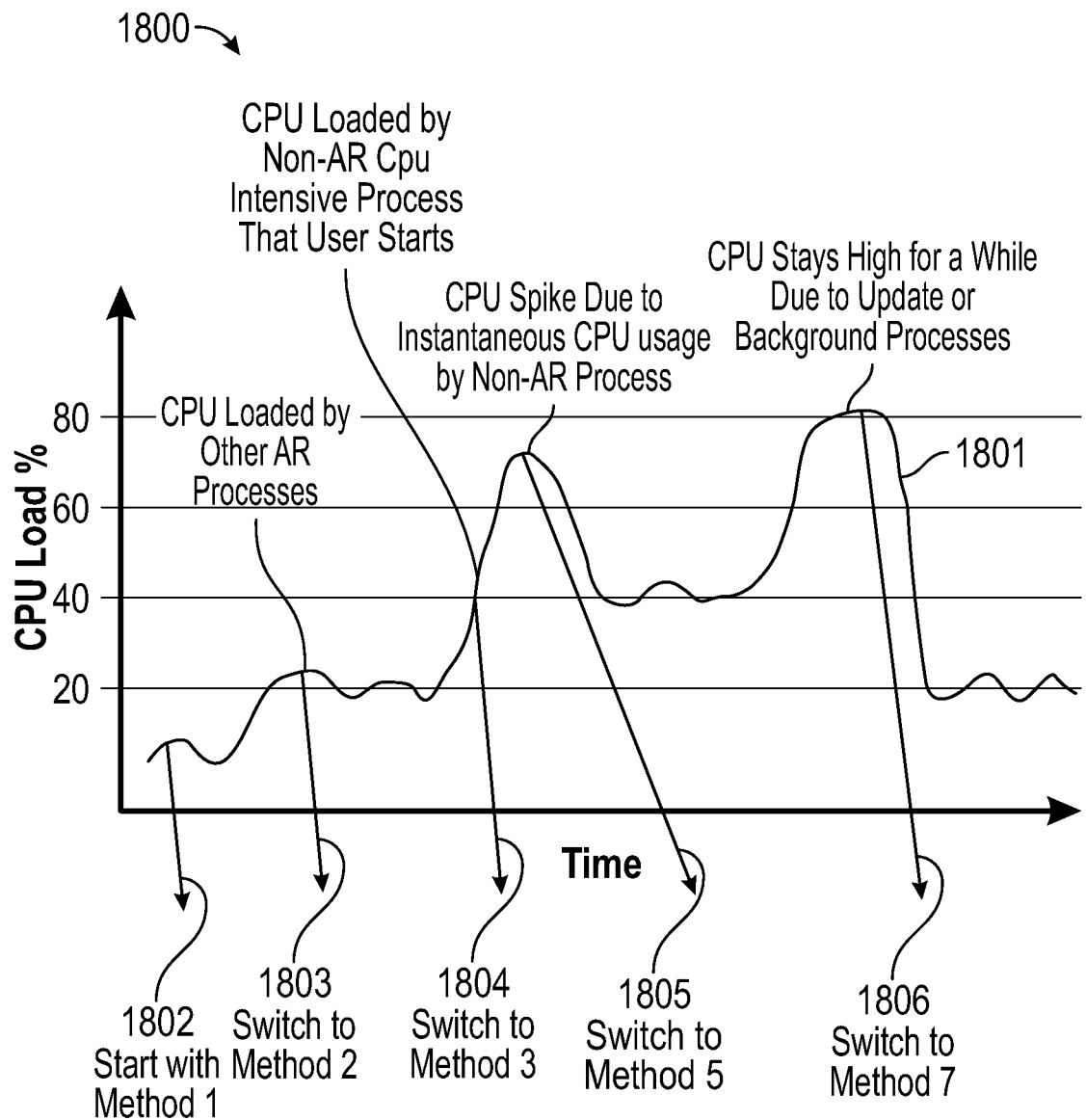
FIG. 18 is a graph of an example of a scalable EGT method use-case, according to some embodiments.

FIG. 18 shows graph 1800 to illustrate operation of scalable EGT method 1400 of FIG. 14. Particularly, curve 1801 illustrates CPU load %, as an example of host IHS resource utilization, varying over time, in an example use-case. At time 1802, tracking and recognition engine 301 selects EGT method 1, at the start of an xR application.

At time 1803, curve 1801 shows that the CPU is loaded by xR resources (other than EGT), and in response method 1400 selects EGT method 2 for further EGT processing by block 1402 of FIG. 14. At time 1804, curve 1801 shows that the CPU has been loaded by non-xR processes launched by the user concurrently with the xR application, and in response method 1400 selects EGT method 3.

At time 1805, curve 1801 shows that the CPU has suffered a spike due to instantaneous CPU usage by non-xR processes, and in response method 1400 selects EGT method 5. Then, at time 1806, curve 1801 shows that the CPU usage stays high for a threshold amount of time to an Operating System (OS) update or background process, and in response method 1400 selects EGT method 7. (In other use-cases, method 1400 may additionally or alternatively select higher ranked EGT methods in response to CPU utilization being reduced.)

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
   monitor utilization of an IHS resource;
   capture an image of a gesture performed by a user wearing a Head-Mounted Device (HMD) during a virtual, augmented, or mixed reality (xR) application;
   generate a feature vector usable to identify the gesture based upon the image, wherein the feature vector has a maximum number of features selected, wherein the maximum number of features varies as the utilization level of the IHS resource varies and is automatically selected based upon the current IHS resource utilization level;
   rank features usable to identify a first gesture and a second gesture;
   determine that the second gesture is indistinguishable from the first gesture based upon a comparison between a higher-ranked subset of features of the first gesture a higher-ranked subset of features of the second gesture; and
   disable recognition of the second gesture if the second gesture is indistinguishable from the first gesture.

2. The IHS of claim 1, wherein the IHS resource comprises the processor.

3. The IHS of claim 1, wherein the IHS resource comprises the memory.

4. The IHS of claim 1, wherein the maximum number features is selected to maintain the IHS resource utilization below a predetermined level.

5. The IHS of claim 1, wherein the maximum number of features is selected based upon a calibration curve that associates a reduction in a number of used features with a corresponding reduction in IHS resource utilization.

6. The IHS of claim 1, wherein the maximum number of features is selected based upon a calibration curve that associates an increase in number of used features with a corresponding increase in IHS resource utilization.

7. The IHS of claim 1, wherein the program instructions, upon execution, further cause the IHS to:
   identify an increase in IHS resource utilization; and
   reduce the maximum number of features to prevent reaching a maximum IHS resource utilization.

8. The IHS of claim 1, wherein the program instructions, upon execution, further cause the IHS to:
   identify a decrease in IHS resource utilization; and
   increase the maximum number of features without reaching a maximum IHS resource utilization.

9. The IHS of claim 1, wherein to rank the features, the program instructions, upon execution, further cause the IHS to:
   calculate a Pearson's Correlation Coefficient (PCC) for each of the features; and
   order the features by respective PCCs, wherein a feature having a value closest to zero is ranked highest.

10. The IHS of claim 1, wherein the program instructions, upon execution, further cause the IHS to select the first and second gestures based upon an Euclidian distance between the first and second gestures.

11. The IHS of claim 1, wherein the program instructions, upon execution, further cause the IHS to select one of a plurality of eye-gaze tracking (EGT) methods based upon the IHS resource utilization.

12. A method, comprising:
    monitoring utilization of an Information Handling System (IHS) resource;
    selecting an eye gaze tracking (EGT) method usable to detect eye movement of a user wearing a Head Mounted Device (HMD) coupled to the IHS during a virtual, augmented, or mixed reality (xR) application based upon the IHS resource utilization;
    capturing an image of a gesture performed by a user;
    generating a feature vector usable to identify the gesture based upon the image, wherein the feature vector has a maximum number of features selected based upon the IHS resource utilization, wherein the maximum number of features varies as the utilization level of the IHS resource varies and is automatically selected based upon the current IHS resource utilization level; and
    disabling recognition of the gesture if the maximum number of features renders the gesture indistinguishable from another gesture.

13. The method of claim 12, wherein the EGT method is selected from the group consisting of: a two-dimensional (2D) method, or a three-dimensional (3D) method.

14. The method of claim 12, wherein the EGT method is selected based upon a calibration that associates a reduction in EGT features or accuracy, with a corresponding reduction in IHS resource utilization.

15. The method of claim 12, wherein the EGT method is selected based upon a calibration that associates an increase in EGT features or accuracy with a corresponding increase in IHS resource utilization.

16. A hardware memory device of an Information Handling System (IHS) having program instructions stored thereon that, upon execution by a hardware processor, cause the IHS to:

monitor utilization of an IHS resource;

select an eye gaze tracking (EGT) method based upon the IHS resource utilization, wherein the EGT method is usable to detect eye movement of a user wearing a Head Mounted Device (HMD) during a virtual, augmented, or mixed reality (xR) application;

capture an image of a gesture performed by a user;

generate a feature vector usable to identify the gesture based upon the image, wherein the feature vector has a maximum number of features selected, wherein the maximum number of features varies as the utilization level of the IHS resource varies and is automatically selected based upon the current IHS resource utilization level; and disable recognition of the gesture if the maximum number of features renders the gesture indistinguishable from another gesture.

17. The hardware memory device of claim 16, wherein the eye-gaze tracking method is selected based upon a calibration that associates: (i) an increase in EGT features or accuracy with a corresponding increase in IHS resource utilization; or (ii) a reduction in EGT features or accuracy with a corresponding reduction in IHS resource utilization.

18. The hardware memory device of claim 16, wherein the maximum number of features is selected based upon a calibration that associates: (i) an increase in number of used features with a corresponding increase in IHS resource utilization; or a reduction in a number of used features with a corresponding reduction in IHS resource utilization.

* * * * *